Patented Aug. 2, 1949

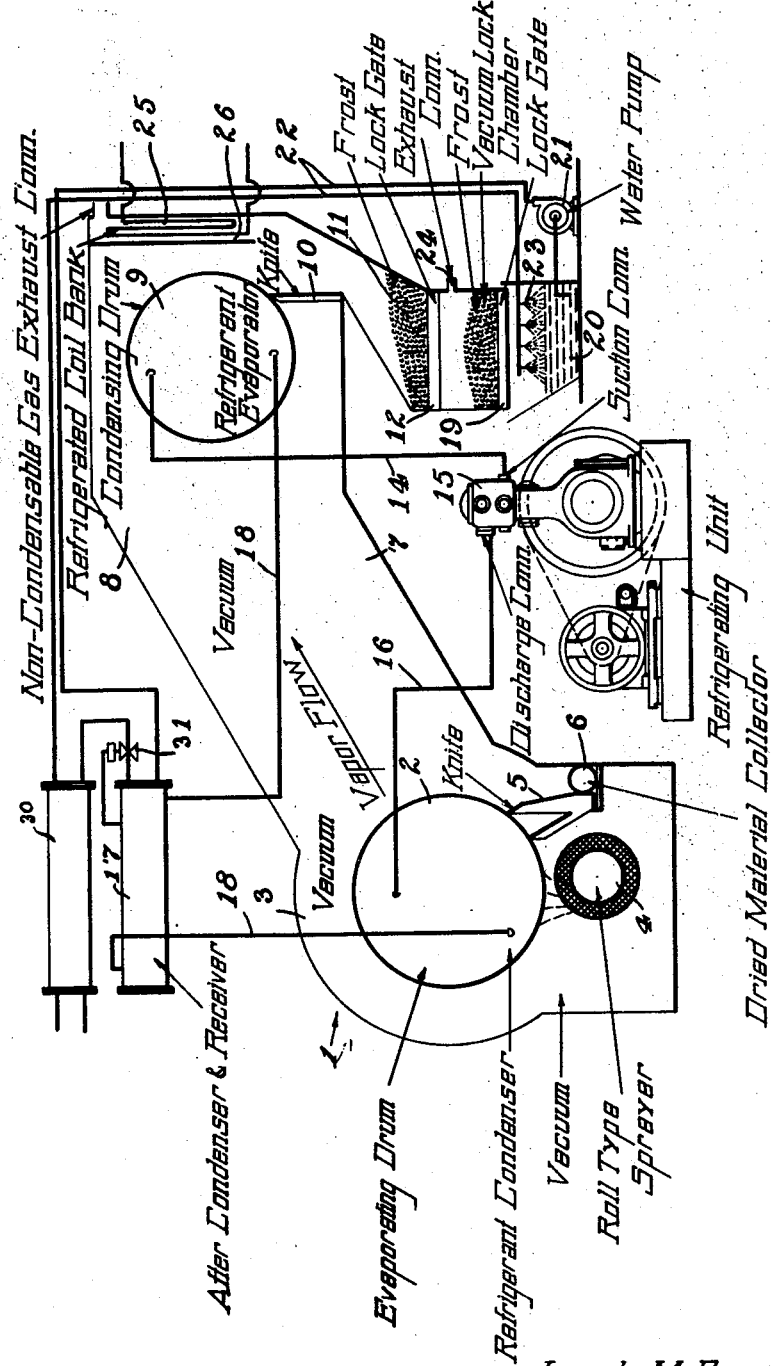

2,477,959

UNITED STATES PATENT OFFICE 2,477,959

BALANCED HEAT SYSTEM FOR VACUUM DRYING

Joseph Mason Brown, Westfield, N. J., assignor to Worthington Pump and Machinery Corporation, Harrison, N. J., a corporation of Delaware Application October 3, 1944, Serial No. 557,024

5 Claims. (Cl. 159—47)

1

This invention relates to low temperature dehydration of solids suspended or dissolved in liquids, and more particularly to improvements in vacuum dehydrating or desiccating systems which will improve the effectiveness of such systems, reduce their cost of operation, and provide a system and apparatus of the low pressure, low temperature type which may be used commercially to dehydrate relatively large quantities of nutritional or therapeutic substances or the like and preserve their valuable properties.

In low temperature, low pressure dehydrating systems wherein a liquid is to be treated for the dehydration of its contained solids, the liquid in a vacuum chamber is subjected to a temperature corresponding to the absolute partial pressure of saturated water vapor in the vacuum chamber and at the same time heat is added to supply the heat of evaporation of the water. The dried product from which the water vapor has been driven off is collected in any suitable manner, and the water vapor is condensed on a colder surface and disposed of in any suitable manner, while the non-condensible gases are exhausted to atmosphere or to any suitable receiver, depending upon the product being treated and the desired or necessary disposition. Thus in such systems, a refrigerating or cooling system is employed for condensing the water vapor.

The present invention comprehends a system of this type wherein the heat liberated by the condensation of the water vapor is absorbed by the evaporation of liquid refrigerant, and the heat of condensation of compressed refrigerant vapor is absorbed by evaporation of water from the material being dehydrated. Both the evaporation of water and the condensation of the water vapor produced take place in a vacuum chamber under substantially the same absolute total pressure of saturated water vapor and non-condensable gases by maintaining a colder condensing surface in one part and a warmer evaporating surface in another part of that chamber.

With these and other objects in view, as may appear from the accompanying specification, the invention consists of various features of construction and combination of parts, which will be first described in connection with the accompanying drawing which shows a diagrammatic view of the improved balanced heat system for vacuum drying, and the features forming the invention will be specifically pointed out in the claims.

Referring more particularly to the drawing, the substance which is to be dehydrated is delivered to the drum drier structure 1 which is

2 generically indicated in the drawings and may be of any suitable type of vacuum drum drier such as those manufactured by the Buffalo Foundry and Machine Company of Buffalo, New York, and the Stokes Company of Philadelphia, Pennsylvania. Since these drum driers are of well known construction and may be purchased upon the open market, the structure is not shown in detail in the drawings, and will not be specifically described, only such description being included as will enable an understanding of the operation of the system of the present invention.

In such drum drier structures, a rotatable drum 2 is mounted in vacuum chamber 3 and the substance to be dehydrated is picked up by any suitable type of spraying device such as shown at 4 and spread over the outer surface of the rotating evaporating drum 2. The dried material is scraped from the surface of the drum by suitable scraper 5 and carried off by any suitable type of collecting mechanism indicated at 6. The water vapor and non-condensible gases released by the drying of the substance on the evaporating drum 2 in section 3 pass through the sections 7 and 8 of the vacuum chamber wherein the same vacuum is maintained. It is understood that the desired vacuum is maintained in the vacuum chamber and that liquid to be evaporated on drum 2 has a temperature higher than that of saturated water vapor in the chamber, while the surface of the condensing drum 9 has a lower temperature, so water vapor passes from drum 2 to drum 9. Like the evaporating drum 2, this condensing drum is of a conventional type which may be purchased upon the open market and is manufactured by the same manufacturers who manufacture the evaporating drum 2.

The water vapor in the vacuum chamber is condensed, freezes, and collects as ice or snow on the surface of the cold rotating condensing drum 9, and it is scraped from the rotating condensing drum 9 by a suitable scraper 10 and falls into a collection chamber 11. The collection chamber 11 is divided into a plurality of compartments as shown in the drawing which compartments have communication through any suitable type of a vacuum lock gate structure generically indicated at 12.

For the purpose of the present invention, a closed refrigerant system is provided. The liquid refrigerant which is vaporized in the water vapor condensing drum 9 by its absorption of the heat of condensation of the water vapor, passes as a vapor through the connection 14 to the inlet of a refrigerant compressor 15 of any suitable type which may be purchased upon the open market. The compressed refrigerant vapor is delivered from the discharge of the compressor 15 through a suitable connection 16 into the interior of the water evaporating drum 2 where some of the heat of its condensation and heat provided by the compressing action in the compressor 15 is transferred through the drum 2 and absorbed by the evaporation of the water in the substance being dehydrated. A part of the compressed refrigerant vapor will be condensed in the evaporating drum, and this condensed liquid refrigerant together with such refrigerant vapor as is not condensed in the evaporating drum passes to a refrigerant condenser 17 of the standard surface type through a suitable connection 18 where all of the remaining refrigerant vapor is condensed and its liquid cooled and from which the liquid refrigerant is passed to the water vapor condensing drum 9, which is the refrigerant evaporator, through a suitable connection 18.

The refrigerant vapor condensation is completed in the condenser 17 by the circulation of a coolant, and the present invention comprehends the employment of the condensed water vapor as this coolant. The water vapor in the form of ice or snow passes through the various compartments of the chamber 11 and through a final vacuum lock gate 19 of any approved type into an open container 20. The water warmed by condensation of the refrigerant vapor in condenser 17 is sprayed into the container 20 and causes a melting of such ice or snow, and this cold water is picked up by a pump 21 and recirculated through the condenser 17 through suitable piping 22 being returned to the container 20 and sprayed thereinto through any approved type of spray means 23.

Owing to the fact that the melting of the ice may not cool the water as much as is necessary to complete the condensation of the refrigerant in the after condenser 17, a second water cooler 30 is connected in the system through which a suitable refrigerant is circulated from any approved type of refrigeration mechanism (not shown). The cooler 30 is, as shown in the drawing, connected in the circuit of the water from the container 20 so that this water first passes through the cooler 30 for lowering its temperature prior to its passage through the after condenser 17. A pressure actuated valve 31 is interposed in the connection between the cooler 30 and the condenser 17 and is operated by the pressure of the vaporized refrigerant in the condenser 17 to control the flow of the circulating cooling medium through the condenser 17 so as to maintain any desired temperature therein and in the refrigerant evaporating drum 2.

The chamber 11 is provided with an exhaust connection 24 through which non-condensable gases are removed.

The non-condensable gases released by the condensation of the water vapors in the vacuum chamber 8 pass through a non-condensable gas exhaust connection 25 to which may be connected any suitable means (not shown) for withdrawing the non-condensable gases from the vacuum chamber 8. If it is so desired, a refrigerating coil of any approved type generically indicated at 26 may be placed in the non-condensable gas exhaust connection 25 for cooling this gas and reducing its volume, and consequently permitting the use of a smaller type evacuating means that would otherwise be applicable for use. The refrigerating coil 25 may receive its refrigerating medium from any suitable source (not shown).

From the foregoing description taken in connection with the accompanying drawing, it will be apparent that an economical vapor-condensing system for vacuum drying apparatus has been provided wherein the heat absorbed by the refrigerant in the condensing of the water vapors and by the compression of the vaporized refrigerant is utilized as the heating agent to drive off the water vapors in the evaporating chamber and that the condensed water vapors are in turn utilized as the coolant for condensing the refrigerant which is vaporized in the evaporating chamber.

It will be understood that the invention is not to be limited to the specific construction or arrangement of parts shown, but that they may be widely modified within the invention defined by the claims.

What is claimed is:

1. The method of low pressure low temperature desiccation of substances which comprises maintaining a vacuum chamber at a predetermined temperature by the condensation of a refrigerant therein, subjecting the substance to be dehydrated to dehydrating action in said vacuum chamber at a temperature above the temperature corresponding to the absolute pressure in the vacuum chamber to release from the substance contained water as vapor, passing refrigerant vapor and liquid refrigerant from the vacuum chamber to a second point of condensation for condensing any residue refrigerant vapor, passing the condensed refrigerant from said second point of condensation in heat exchange relationship with the water vapor released from said substance to condense the water vapor and vaporize the refrigerant, utilizing the condensed water vapor removed from the substance as a coolant for condensing the refrigerant vapor at said second point of condensation, compressing the vaporized refrigerant and returning the compressed vaporized refrigerant to said vacuum chamber for releasing the absorbed heat of condensation of the water vapor and the heat of compression from the compressed refrigerant to provide the dehydration temperature in the vacuum chamber.

2. The method of low temperature desiccation of substances as claimed in claim 1 which includes chilling the condensed water vapor prior to utilizing it as a coolant for the condensing of the refrigerant vapor at the second point of condensation.

3. The method of low temperature desiccation of substances as claimed in claim 1 wherein part of the released water vapor is frozen during its condensation by being passed in heat exchange relationship with the condensed refrigerant, and including the bringing into mixing contact of frozen water vapor and condensed water vapor used as a coolant at the second point of condensation of the refrigerant vapor thereby utilizing the heat of condensation absorbed by the water vapor at the second point of condensation to melt the frozen water vapor.

4. In an apparatus for desiccating liquids, a vacuum chamber, an evaporator in said vacuum chamber for removing water as vapor from the material to be desiccated, a condenser in said vacuum chamber for condensing the removed water vapor, a compressor for compressing vaporized refrigerant a conduit for delivering refrigerant vapor from said compressor to said evaporator at a temperature above the temperature corresponding to the absolute pressure in the vacuum chamber, an after condenser, means for delivering refrigerant from said evaporator to said after condenser for condensing and cooling the refrigerant from the evaporator, means for delivering condensed refrigerant from said after condenser to said water vapor condenser, means for delivering refrigerant vapor from said water vapor condenser to said compressor, and means for delivering the condensed water vapor to said after condenser for use as a coolant to condense the refrigerant in the after condenser.

5. An apparatus for desiccating liquids as claimed in claim 4 including a container receiving condensed water vapor from said vapor condenser, a conduit for delivering water vapor from said after-condenser to said container, and a pump for delivering condensed water vapor from the said container to said after-condenser for circulation therethrough as a coolant.

JOSEPH MASON BROWN.

REFERENCES CITED

The following references are of record in the file of this patent:

UNITED STATES PATENTS

| Number | Name | Date |
|---|---|---|
| 1,119,011 | Grosvenor | Dec. 1, 1914 |
| 1,465,020 | Monti | Aug. 14, 1923 |

FOREIGN PATENTS

| Number | Country | Date |
|---|---|---|
| 646 | Great Britain | Jan. 12, 1905 |
| 8269/32 | Australia | July 14, 1932 |

OTHER REFERENCES

Building Heating with Refrigerating Equipment, pages 948–9, Power, June 16, 1931.